W. J. KNOX.
PINENE OZONID.
APPLICATION FILED MAY 12, 1910.
1,086,372.
Patented Feb. 10, 1914.
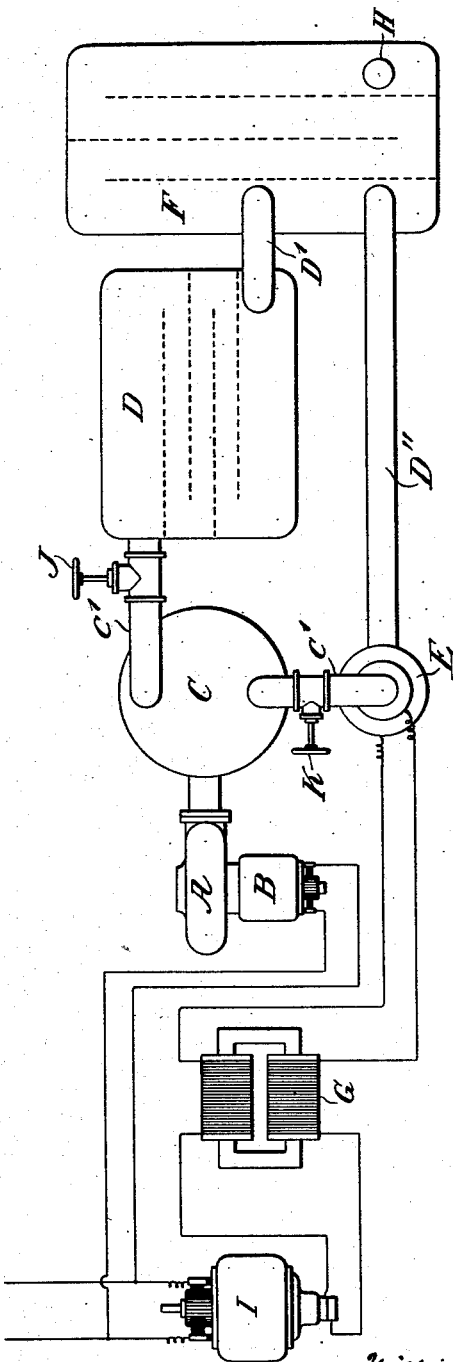
Witnesses:
William John Knox Inventor
By his Attorneys

UNITED STATES PATENT OFFICE.

WILLIAM JOHN KNOX, OF NEW YORK, N. Y., ASSIGNOR, BY DIRECT AND MESNE ASSIGNMENTS, TO KNOX TERPEZONE COMPANY OF AMERICA, A CORPORATION OF WEST VIRGINIA.

PINENE OZONID.

1,086,372.  Specification of Letters Patent.  Patented Feb. 10, 1914.

Application filed May 12, 1910. Serial No. 560,764.

*To all whom it may concern:*

Be it known that I, WILLIAM JOHN KNOX, a citizen of the United States, and a resident of New York city, borough of Manhattan, in the county of New York and State of New York, have invented certain new and useful Improvements in Pinene Ozonid; and I do declare the following to be a full, clear, and exact description of the invention, such as will enable others skilled in the art to which it appertains to make and use the same.

My invention relates to that class of chemical compounds known as ozonids, or compounds containing the ozone molecule in direct combination.

The object of the present invention is the production of such an ozonid but in a suspended or vaporous state. Hitherto such ozonids as have been produced have been either in the liquid or solid state.

In the present state of the art the known antiseptic or germicidal gases or vapors are of the nature of formaldehyde, sulfurous anhydrid, or chlorin, and are all either poisonous, caustic or highly irritating to the mucous membranes, and are not respirable excepting in extremely minute quantities; and the further object of this invention is, therefore, to produce a vaporous ozonid or an ozonid in a suspended state that, when used as a germicide, will be non-poisonous, and non-irritating when inhaled even in a highly concentrated form.

The inventor has discovered that turpentine or pinene, the structural formula of which is,—

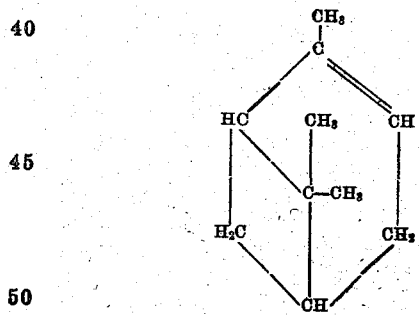

when in the form of a vapor will unite directly with ozone,

and form an addition product the structural formula of which is therefore,—

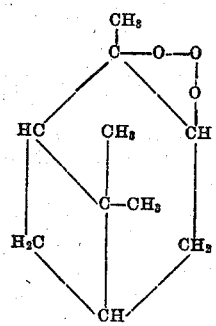

or a polymer thereof and which is a true ozonid and is a vapor or gas.

This new compound is the simple, direct chemical union of pinene vapor and ozone. There are no by-products or intermediate products. The ozone does not split up into molecular oxygen, $O_2$, and O, and the latter uniting with the pinene, but unites wholly in the manner described.

The manner of manufacture is to ozonize air or oxygen by any well-known means and to pass this mixture containing ozone into admixture with the vapor of pinene. The two gases before uniting are invisible but on admixture form a visible white or bluish white vapor. This vapor can be carried through long tubes without condensation but when discharged into the free air, on account of its high vapor tension, diffuses and becomes invisible.

The vapor consists of extremely fine solid particles in suspension, so fine that they will not settle upon a surface even when carried for long periods of time through long tubes, and this fact has been determined by employing glass tubing to convey it.

The germicidal power of the vapor has been established by a long series of bacteriological tests. For example,—it has been found that cultures of *Bacillus staphylococ-* cus, *B. streptococcus*, and *B. coli*, when exposed as suspensions on glass rods to small quantities of the vapor, are invariably killed in between thirty minutes and one hour.

The non-poisonous and non-irritating character of the vapor has been determined by inhaling it continuously in concentrated form for long periods of time. The physiological effect is one of salubrity and buoyancy. The vapor does not show the presence of ozone either by breathing or by chemical test and the presence of pinene vapor has not been detected. The odor is neither that of pinene nor ozone but is that of a pine balsam.

It has not been found necessary to heat the pinene to cause its volatilization, as the excess of free oxygen and nitrogen in passing over its surface causes an increase or decrease in the rate of evaporation and hence regulates the quantity of pinene vapor in accordance with the amount of ozone passing.

I wish to call especial attention to the fact that the pinene is first vaporized before it is intermingled with the ozone. The inventor believes that this method of forming an ozonid vapor by first converting a liquid into the form of vapor and then acting upon this vapor by intermingling with it ozone or intermingling ozone and a vapor thus formed is new.

The preferable method employed by me may be described in connection with the diagrammatic plan of the apparatus shown in the accompanying drawing in which—

A is a fan blower for forcing air through the apparatus; B is an electric motor for driving the fan A; C is a vessel containing fused calcium chlorid or slaked lime for extracting the moisture from the air; D is a pinene vaporizing vessel; E is an ozone-generating device; F is a vessel in which the ozone gas and the pinene vapor intermingle and combine, and G is an electrical transformer in which a low voltage electric current is raised or stepped up to a higher voltage suitable for operating the ozone-generating device E. As an alternating current is required, it is further necessary, if the current available is of the direct type, to interpose in the line a rotary converter or dynamotor I whereby the direct current may be changed into an alternating current.

Air is propelled by the electrically driven fan A through the air-drying vessel C whereby the moisture in the air is extracted. This dried air is then caused to pass by means of a pipe or other conduit c' to the vessel D, and also by another pipe or conduit c'' to the ozone-generating device E. The amount of air passing into the pinene vaporizing chamber D may be regulated by means of a suitable valve J in pipe c'. The area of the surface of pinene in chamber D is such; that is, so large, that, even when the maximum amount of dry air is passed over its surface, an approximately saturated temperature will result. In consequence of this uniform saturation, the quantity of pinene evaporated is a direct function of the amount of air allowed to pass through the vessel D over the surface of the pinene. Likewise, a valve K is placed in the pipe c'' passing from the air-drying chamber c to the ozone-generating device E whereby the ozone generated may be made of any desired concentration.

The electric current for operating the ozone-generating device E must be of the high tension alternating, or high frequency, type, and for producing this current an electric transformer G is provided of such a ratio between the primary and secondary coils as will transform a low voltage alternating current, such as the ordinary 110 volt lighting current, to a high voltage alternating current. The inventor has found the best voltage to be 8,000 to 10,000 volts. Where the service current at hand is a direct current, it is necessary to interpose a rotating converting machine I or dynamotor to change such current into the interrupted or alternating type. The resulting ozonized air from the ozone-generating device E and the dry saturated pinene vapor from the pinene vaporizing vessel D are now conducted by means of the respective pipes or conduits D' and D'' to a vessel F. This vessel F is made preferably of zinc, aluminum or block tin, and is divided into passages or partitions whereby the two streams of air carrying, respectively, ozone gas and pinene vapor will be brought into intimate admixture and thoroughly diffuse and intermingle.

The ozonized air and the pinene saturated air are each colorless or invisible, but, when intermingled, at once unite and form a dry opaque white product, which consists of molecularly fine suspended particles of a solid pinene ozonid. This pinene ozonid cloud, when in moving air, or the air of a room, flows and diffuses freely, but, if passed into a closed vessel and allowed to remain quiescent, will slowly subside or settle, leaving a clear space above it. In the atmosphere of a room, even when the terpezone has been generated for months, there is no trace of deposit, even on mirrors. Pinene ozonid has a high vapor tension similar to camphor and passes into the true gaseous state without dissociation. After thoroughly commingling and combining in chamber F, the pinene ozonid leaves this chamber at a suitable opening H, from which it may be allowed to escape freely into a room or may be conducted by pipes to a distance.

In practice I govern the exactness of the mixture by first allowing the ozone to pass out of the apparatus in excess of the amount required to form a neutral mixture. The pinene regulating valve is then so manipulated as gradually to increase the amount of pinene entering the combining chamber F until the resulting pinene ozonid does not show any, or an appreciable amount of free ozone by a chemical test, such as potassium iodid and starch paper. The temperature of the reaction is that of the atmosphere.

I do not claim herein the process of producing gaseous ozonids broadly, having made such subject-matter the basis of a separate application filed by me December 2, 1911, Serial No. 663,602, and I also do not claim herein the apparatus for producing gaseous ozonids illustrated herein diagrammatically, having made the same the subject-matter of a separate application filed March 11, 1912, Serial No. 683,118.

Having thus fully set forth my invention, what I claim as new, and desire to secure by Letters Patent, is:

An inhalable germicidal compound consisting of a direct addition product of vapor of pinene and ozone having the formula

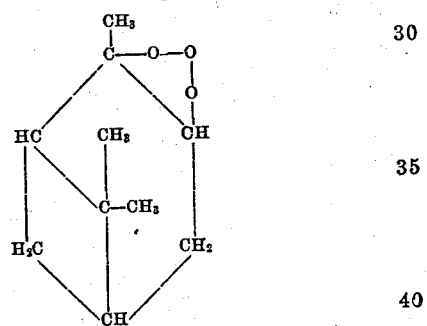

and being white and opaque in appearance, non-condensable, freely respirable and having high vapor tension.

In testimony whereof I have hereunto signed my name in the presence of two subscribing witnesses.

WILLIAM JOHN KNOX.

Witnesses:
M. E. McNinch,
C. G. Heylmun.